May 5, 1942.　　　C. T. LANGMAID ET AL　　　2,281,699
CLINCH-NUT
Filed July 18, 1940

INVENTORS
Charles T. Langmaid
Plummer E. Double
BY Edward M. Apple ATTY

Patented May 5, 1942

2,281,699

UNITED STATES PATENT OFFICE 2,281,699

CLINCH NUT

Charles T. Langmaid and Plummer E. Double, Detroit, Mich., assignors to Fabristeel Products, Inc., Detroit, Mich., a corporation of Michigan Application July 18, 1940, Serial No. 346,222

1 Claim. (Cl. 85—32)

This invention relates to clinch-nuts and this application may be considered a continuation in part of our pending application S. N. 278,935, filed June 13, 1939, since issued as Patent No. 2,214,198, September 10, 1940.

The nut proposed to be made through the practice of the present invention is formed with the corners of the body portion rounded instead of square.

The practice of forming slight radii on the body portion has certain definite advantages in commercial practice. It has been found that clinch-nuts having bodies with absolutely square corners often times cause the metal of the securing piece to crack at the corners when much stress is placed on the nut so secured, whereas the nut having the rounded corners will distribute the stress and strain more evenly to the securing piece. It has also been found that a nut having the body formed with a slight radius at each corner is much easier located in the corresponding aperture of the securing piece.

The invention has a further advantage, in that it permits a clinch-nut to be formed with the corners of the body rounded, without distorting the nut, and without the necessity of working on the flange of the nut as well as the body portion, as is done in the cold heading process. It is well known that the more the metal of the nut is worked, the harder it becomes, therefore, the harder it is to tap.

Our teaching enables the manufacturer to produce a clinch-nut which has some of the metal at the corners displaced upwardly. This results in a comparatively increased thickness of metal at the corners, which when again displaced outwardly over the securing member during the attaching operation, makes a much firmer connection.

The foregoing objects and advantages of the invention, and others, will be better understood as the description proceeds, reference being made to the accompanying drawing, which forms a part of the disclosure, wherein.

Figure 1:
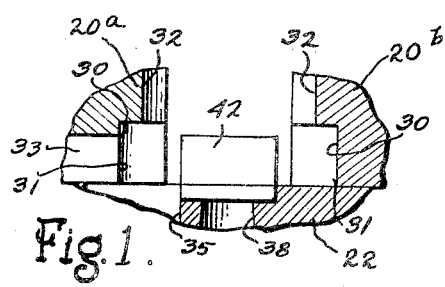
Fig. 1 is an enlarged fragmentary detail partly in section, illustrating a nut blank in position, ready to be worked on in the forming operation.
Figure 2:
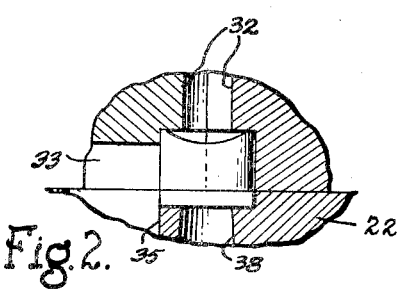
Fig. 2 is a view similar to Fig. 1, but showing the nut blank after the body portion has been formed with a radius at each corner and being held for the subsequent piercing operation. This view illustrates how the metal at the corners is displaced upwardly during the forming operation.
Figure 4:
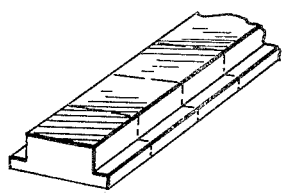
Fig. 4 is a perspective view of a length of preformed steel, from which the nut blanks are cut.
Figure 3:
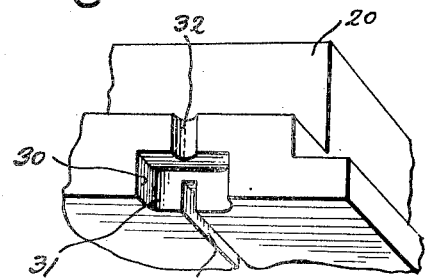
Fig. 3 is an enlarged fragmentary perspective view of one element of the forming and holding die. This view illustrates the die cavity with a vertical passage-way for the entrance of the punch and the horizontal passage-way for the entrance of the stripper pin.
Figure 5:
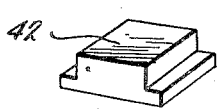
Fig. 5 is a perspective view of a nut blank before it is formed and pierced. This view illustrates how the body of the nut may be formed with a radius at each corner without in any wise distorting or affecting the flange portion of the nut.
Figure 6:
Fig. 6 is the nut blank illustrated in Fig. 5, after it has been formed and pierced.
Figure 8:
Fig. 8 is a perspective view of the nut after it has been formed, pierced and tapped and ready to be secured to another element.

Referring now more particularly to the drawing, it will be seen that the means employed in forming the nut comprise the forming and holding dies 20 and their associated elements, as hereinafter described. The forming and holding dies 20 are made in two sections 20a and 20b, which are adapted to reciprocate in any suitable manner. The working faces of the die sections 20a and 20b are provided with two or more matched recesses 30, as illustrated in Fig. 3, wherein it will be seen that the recesses are formed with a slight radius 31 at each corner. Each recess 30 has a vertical passage-way 32, extending into it, which passage-way is intended to permit the entrance of a punch (not shown). Each of the die sections has a horizontal passage-way 33, Fig. 3, communicating with at least one of the recesses 30, which passage-way 33 is intended to accommodate a stripper pin (not shown) which is intended to strip the nuts from the recesses 30 after they have been worked upon. Rectangular apertures 35 are formed in the bed plate 22 (Fig. 1) and communicate with chutes (not shown), which are adapted to carry away the nuts after they have been formed and pierced.

Apertures 36 are formed in the bed plate 22 to accommodate the punches and to permit the slugs, which are punched from the nut blanks, to be carried away.

Figure 7:
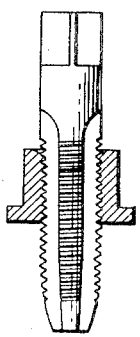
Fig. 7 is an enlarged fragmentary detail partly in section diagrammatically illustrating the tapping of the formed and pierced blank illustrated in Fig. 6.
Figure 9:
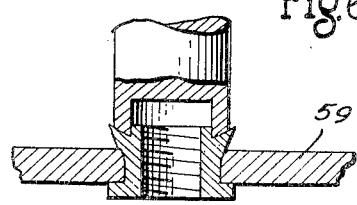
Fig. 9 is an enlarged fragmentary detail in section illustrating the manner in which the nut illustrated in Fig. 8 is secured to another element as a sheet of metal.
Figure 10:
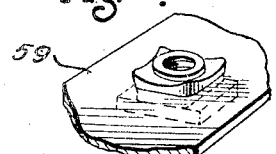
Fig. 10 is a perspective view of the nut illustrated in Fig. 8, after it has been attached to an apertured sheet of metal.

After the nuts are formed and pierced, they are then tapped as indicated in Fig. 7 and are ready for attachment to other elements, such as a sheet of metal 59 as suggested in Figs. 9 and 10. Upon the completion of the inward movement of the die sections, the body of the nut held in position is worked upon forming the radii at the corners. After the forming operation and while the die sections are held in closed position and upon the same stroke of the press header (not shown), a punch enters the opening 32 in the die sections, thereby piercing the hole in the blank.

From the foregoing it will be seen that the radii are formed on the bodies of the nuts without in any way disturbing the corners of the flanges of the nuts as is the case in most cold heading processes.

Having described our invention what we claim and desire to secure by Letters Patent is:

In a clinch-nut having a substantially rectangular, threaded body portion and a flat flange, the improvements comprising a plurality of convexly rounded corners on the body, the convex corners of the body being formed by upwardly displacing some of the nut body, which results in the formation of a slightly irregular concave surface on the top of the nut body, the flat flange remaining in undisturbed condition.

CHARLES T. LANGMAID.
PLUMMER E. DOUBLE.